United States Patent [19]

Chen et al.

[11] Patent Number: 5,310,850

[45] Date of Patent: May 10, 1994

[54] HEAT RESISTANT POLY(URETHANE AMIDEIMIDE) COMPOSITION AND METHOD FOR PREPARING THE SAME

[75] Inventors: Jyh-Chien Chen, Chayi; Sheng Yaw Hsu, Taichung; Tzong-Ming Lee, Tainan; Jing-Pin Pan, Hsinchu, all of Taiwan

[73] Assignee: Industrial Technology Research Institute, Hsinchu, Taiwan

[21] Appl. No.: 966,738

[22] Filed: Oct. 26, 1992

[51] Int. Cl.$^5$ .................... C08G 18/34; C08G 18/66
[52] U.S. Cl. .................................. 528/73; 528/76; 528/80; 528/83; 528/84; 528/85; 524/726
[58] Field of Search ................ 528/73, 76, 80, 83, 528/84, 85; 524/726

[56] References Cited

U.S. PATENT DOCUMENTS

| | | | |
|---|---|---|---|
| 3,317,480 | 5/1967 | Fetscher et al. | 528/59 |
| 3,489,696 | 1/1970 | Miller | 528/84 |
| 3,560,446 | 2/1971 | Zecher et al. | 528/84 |
| 3,812,082 | 5/1974 | Jones | 528/84 |
| 3,869,428 | 3/1975 | Mosimann et al. | 528/45 |
| 4,459,383 | 7/1984 | Lee | 528/73 |
| 4,477,624 | 10/1984 | Waki | 528/84 |
| 4,496,715 | 1/1985 | Sattler | 528/85 |
| 4,654,409 | 3/1987 | Shirai et al. | 528/73 |
| 4,816,544 | 5/1988 | Kemiya et al. | 528/73 |
| 4,880,847 | 11/1989 | Credali et al. | 528/73 |
| 4,921,761 | 5/1990 | Yamada | 528/85 |

FOREIGN PATENT DOCUMENTS 59-204610 11/1984 Japan.
60-3114 1/1985 Japan.

*Primary Examiner*—John Kight, III
*Assistant Examiner*—Rabon Sergent
*Attorney, Agent, or Firm*—W. Wayne Liauh

[57] ABSTRACT

Disclosed is a novel linear urethane-amide-imide copolymer composition obtained from first reacting X mols of diol compound, which had been dissolved in an inert organic solvent, with Y mols of diisocyanate compound at room temperature to produce an intermediate reaction product, followed by reacting the intermediate reaction product with Z mols of trimellitic anhydride at elevated temperatures, wherein Y is greater than X (i.e., the amount of diisocyante groups is in excess) and approximately equals the sum of X plus Z. The polyurethane copolymer composition obtained from this process contains urethane, amide and imide groups on the polymer backbone, exhibits excellent mechanical and electric properties and heat resistance, and does not suffer from the phase separation problems observed from polyurethane-polyamideimide blends.

18 Claims, 1 Drawing Sheet

HEAT RESISTANT POLY(URETHANE AMIDEIMIDE) COMPOSITION AND METHOD FOR PREPARING THE SAME

BACKGROUND OF THE INVENTION

This invention relates to a novel poly(urethane amideimide), or urethane-amide-imide copolymer, composition, which has excellent mechanical strength and heat resistance. More particularly, this invention relates to a heat-resistant linear copolymer composition containing urethane, amide and imide groups in the polymer backbone thereof for use as a wire coating varnish and film material, and the method of making the same.

Polymeric materials have been widely used in the field of electric insulation. Those polymers that have been commonly used in these applications include polyimide, polyamideimide, polyesterimide, polyester, polyurethane, and others. The aforementioned polymers are also useful as adhesives, film insulation material, water sealants, and as packing material for integrated circuits. Polyurethanes are known to have good mechanical properties (i.e., high tensile strength), electric insulating characteristics (i.e., ability to withstand electric overload) and fabricability. Furthermore, because of its relatively low manufacturing cost, the potential market of polyurethane can be quite significant. However, polyurethanes suffer from their lack of heat resistance, therefore, their long-term application is limited to relatively low temperature environment. Many studies have been attempted to improve the heat resistance of polyurethanes.

In the attempts to improve the heat resistance of polyurethane, the following approaches are most commonly employed: (1) using a blending approach to blend heat-resistant material, such as polyimide, polyesterimide, and/or polyamideimide, into the polyurethane matrix to improve the heat resistance thereof; (2) using a blocking agent approach to protect the diisocyanate group in the prepolymer of polyurethane before reacting with polyfunctional alcohols to form a polyurethane copolymer with improved heat resistance. In the first approach, long-term compatibility is a problem; phase separation often occurs in the polyurethane blends resulting in serious degradation of the physical properties thereof. The second approach involves a complicated manufacturing process, and the final product, when hardens, often contains gas bubbles formed therein which adversely affect the product quality and limit its potential applicability.

PRIOR ART

U.S. Pat. No. 3,869,428 disclosed an enamel composition containing imide and urethane groups in the polymer backbone. The composition disclosed therein is a reaction product of a hydroxyl compound A and a phenol-blocked isocyanate compound B. Compound A is synthesized from trimellitic anhydride and diamino compound, such as p,p'-diaminodiphenyl methane to form a dicarboxylic acid containing imide groups. The dicarboxylic acid is esterized with ethylene glycol, trimethylol propane and/or triethylene glycol. Some free hydroxyl groups remain in the final esterized dicarboxylates. Compound B is formed from the reaction of trimethylol propane and diisocyanate. The unreacted isocyanate groups (—N=C=O) are blocked with a phenolic compound. The esterification to form compound A requires a catalyst and is achieved at a reaction temperature in excess of 200° C., and the total reaction time required ranges from 8 to 10 hours. Both of the reactions to form compounds A and B require trimethylol propane, which often causes difficulties in subsequent processing of the final products. Compound B further requires the use of a blocking agent, which can significantly increase the cost of manufacturing.

Japanese Pat. No. Sho 60-3114 disclosed a varnish blend composition obtained from first reacting 1 to 2 mols of trimellitic anhydride with 2 to 3 mols of aromatic diisocyanate to form an intermediate product mixture. After the reaction, α-pyrrolidone was added to the intermediate reaction product mixture to protect unreacted cyanate groups. Finally, the mixture was blended with polyester polyol or polyether polyol, each containing two hydroxyl groups and having a molecular weight greater than $10^4$, to obtain the final blend varnish composition. One of the disadvantages of this reaction process is that it needs to use α-pyrrolidone, which is an expensive blocking agent. Phase separation in the final product is also a problem because of the use of a relatively high molecular weight resin as one of the reactants. The varnish blend composition does not contain urethane linkages.

U.S. Pat. No. 4,816,544 disclosed a polyamideimide elastomer composition obtained from the reaction of (1) one or more carboxyl-telechelic polymers having a molecular weight of between 500 and 10,000, (2) one or more aromatic organic diisocyanates, (3) trimellitic anhydride, and (4) a dicarboxylic acid having 4 to 18 carbon atoms, in a molar ratio of (3)/(4) of being 10/90 to 100/0. The final product is an elastomer, which has low glass transition temperature, Tg, and poor heat resistance. Furthermore, because of its elasticity, the polyamideimide elastomer composition does not meet the requirements in wire coating and insulating material applications.

Japanese Pat. App. No. Sho 59-204610 disclosed a heat-resistant polyurethane composition formed by blending polyurethane with polyamideimide and blocked polyisocyanate. In this disclosure, polyamideimide was produced from the reaction of at least 5 mol percent of citric acid with trimellitic acid, diisocyanate and polyol. Polyurethane was formed by reacting polyisocyanate with polyol. The process disclosed in this patent application suffered several disadvantages. First, m-cresol, which was used as a solvent, is difficult to handle and often causes pollution problems. Second, the production of polyamideimide, which is subsequently used to make the blended modified polyurethane disclosed therein, involved the esterification of citric acid, for which high reaction temperature and long reaction time were required. Further, since the reaction involved tris(2-hydroxyethyl)isocyanate, which is a trifunctional monomer, the final polymer product in not a linear polymer and has poor filmability.

SUMMARY OF THE INVENTION

This invention discloses a novel process by which heat-resistant amide and imide groups are incorporated into the polyurethane backbone during the polymerization reaction. The final product is a linear copolymer that provides both the favorable mechanical properties of polyurethane and the advantageous heat resistance of amide and imide polymers. The method disclosed in this invention involves a relatively simple procedure, and requires relatively inexpensive and commercially available raw material. The poly(urethane amideimide), or urethane-amide-imide copolymer, composition made by the method disclosed in this invention exhibits excellent heat resistance, does not show phase separation problems observed in the prior art polyurethane blend, and can be produced from low-cost raw materials.

The main object of this invention is to develop a process for making modified polyurethane composition that retains the favorable mechanical properties of polyurethane polymer but with improved heat-resistance.

Another object of this invention is to develop a linear copolymer composition containing urethane and amideimide groups which provides the advantageous mechanical properties of polyurethane and the favorable heat resistance of polyamideimide polymers.

Yet another object of this invention is to develop a heat-resistant polyurethane composition free from phase separation problems by incorporating heat resistance amideimide groups into the polyurethane main chain to form a linear urethane-amide-imide copolymer.

Yet another object of this invention is to develop a heat-resistant polyurethane composition that can be produced from inexpensive and commercially available materials.

Yet another object of this invention is to develop a heat-resistant polyurethane composition that can be produced without the need of using a blocking agent.

Yet another object of this invention is to develop a heat-resistant polyurethane composition without incurring undesired waste treatment problems.

To achieve the above mentioned objects, this invention discloses a linear copolymer composition for use in wire coating, and as an insulation, adhesive, and film, etc., containing urethane, amide, and imide groups in the polymer backbone thereof. The polyurethane copolymer composition is produced using a simple procedure, which can be achieved without the need for a blocking agent, from the following three main raw materials:

(1) Diisocyanate: A diisocyanate compound is a compound that contains two isocyanate (—N=C=O) groups. The diisocyanates that can be reacted to obtain the polyurethane copolymer composition of this invention include aromatic, aliphatic, or alicyclic diisocyanates.

(2) Diols: Diols are compounds that contain two hydroxyl groups. Two groups of diols, or the mixture thereof, can be used in this invention. The first group of diols contain polymeric diols such as, for example, polyester-polyols, polyether-polyols and the like. Polyester-polyols include those obtained by polycondensation of one or more aliphatic dicarboxylic acids such as succinic acid, methylsuccinic acid, 2,3-dimethylsuccinic acid, glutaric acid, adipic acid, suberic acid, 2-methyl-1,8-suberic acid, azelaic acid, sebacic acid, 1,10-decanedicarboxylic acid and the like, and one or more low molecular diols or polyols. Polyetherpolyols include polyethylene glycol, polypropylene glycol, polytetramethylene glycol, ethyleneoxide-capped polypropylene glycol and the like, which are obtained by polymerization of one or more cyclic ethers such as ethylene oxide, propylene oxide, tetrahydrofuran and the like.

The second group of diols contains low molecular weight diols including, for example, aliphatic diols having 2 to 20 carbon atoms, such as ethylene glycol, propylene glycol, 1,4-butanediol, 1,3-butylene glycol, 2-methyl-1,3-propanediol, neopentyl glycol, 3-methyl-1,5-pentanediol, 1,6-hexanediol, 2,2-diethyl-1,3-propanediol, 2-ethyl-1,3-hexanediol, 3,3-dimethylolheptane, 1,9-nonanediol, 2-methyl-1,8-octanediol, 1,10-decanediol, etc. They may be used alone or in combination. Other diols polyols suitable for practicing this invention are disclosed in U.S. Pat. No. 4,816,544, which is incorporated herein by reference.

(3) Trimellitic Anhydride (TMA), which has the following structure:

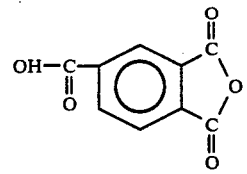

The polymerization reaction disclosed in the present invention takes place in the presence of an inert organic solvent. An inert organic solvent means an organic solvent which does not impair the intended reaction procedure to a noticeable degree. Examples of the inert organic solvents include toluene, xylene, tetralin, tetrahydrofuran, dimethylsulfoxide, N,N-dimethylformamide, N,N-dimethylacetamide, N-methyl-2-pyrrolidone, tetramethylenesulfone, tetramethylurea, hexamethylphosphoramide, dioxane, etc. An important consideration in choosing the appropriate inert solvent is that it be relatively inexpensive and will not cause disposal problems.

In the method disclosed in the present invention, the molal quantity of diisocyanates is stoichiometrically equivalent to the molal sum of all the hydroxyl, carboxyl, and anhydride groups to achieve a complete reaction. The ratio between diols and TMA can be adjusted based on the desired properties of the final product. For example, by changing the ratio between diols and TMA, the elongation of the urethane-amide-imide copolymer can vary from 8% to 240%.

In preparing the urethane-amide-imide copolymer composition of the present invention, X mols of diol compound and Y mols of diisocyanate compound are first dissolved in an inert organic solvent, preferably at room temperature, to produce an intermediate reaction product. The amount of diisocyanate compounds is in excess to therefore allow free N=C=O groups in the intermediate reaction product (i.e., Y>X). Thereafter, Z mols of trimellitic anhydride are added to the intermediate reaction product, at elevated temperatures, to obtain the urethane-amide-imide copolymer of the present invention. To achieve complete reaction of all the reactant monomers, the value of Y preferably should be approximately equal to the sum of X plus Z. The ratio of X/Y ranges preferably between 30/100 and 70/100, and ratio of Z/Y also ranges preferably between 30/100 and 70/100. The polyurethane copolymer composition obtained from this process contains urethane, amide and imide groups on the polymer backbone, exhibits excellent mechanical and electric properties and heat resistance, and does not suffer from the phase separation problems observed from polyurethane-polyamideimide blends.

The reaction that produces the urethane-amide-imide copolymer composition takes place at temperatures between room temperature and 160° C.

DETAILED DESCRIPTION OF THE INVENTION

Figure 1:
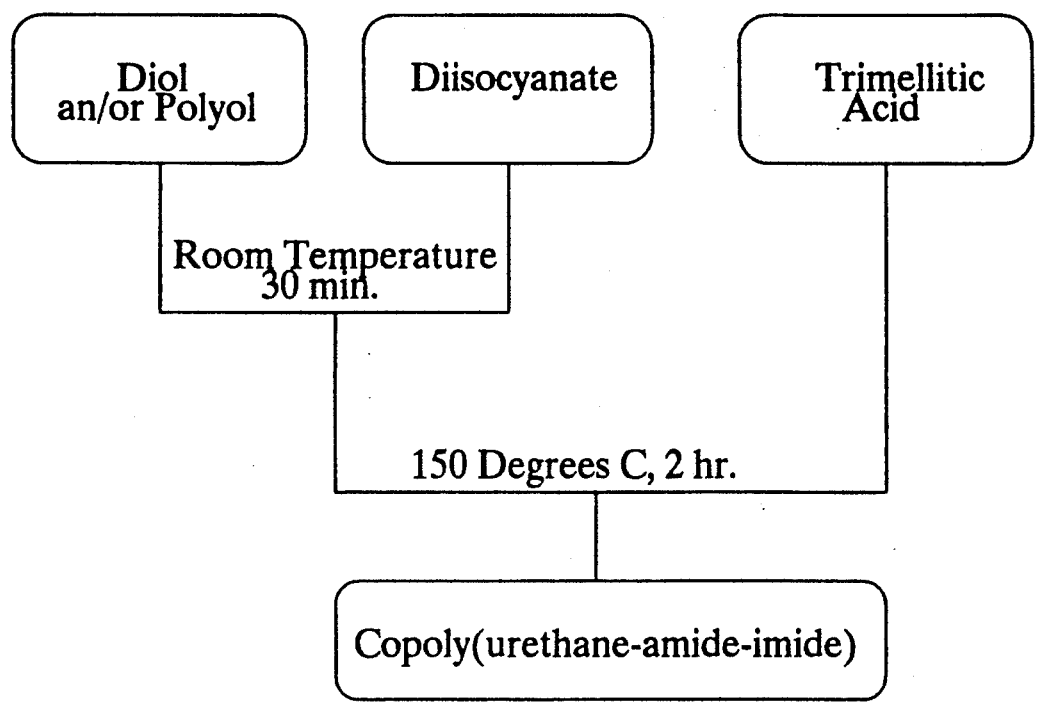
FIG. 1 shows a flow chart diagram of the reaction steps to obtain the modified polyurethane copolymer composition of this invention.

This invention discloses a heat resistant polyurethane copolymer composition synthesized from a novel two-step process illustrated in FIG. 1. The following examples show several embodiments of how to practice this invention. It should be noted that these examples are intended only to aid the understanding of this invention; it should further be understood that the scope of this invention, which is intended to be determined by the appended claims, is by no means limited by these examples.

Example 1

First, 4.3448 g (0.07 mol) of ethylene glycol was dissolved in 76 ml of N-methyl-2-pyrrolidone contained in a 250-ml three-mouth reaction vessel. Then, 25.03 g (0.1 mol) of 4,4'-diphenylmethane diisocyanate was added to the solution. The solution was stirred for 30 minutes at room temperature. After that, 5.7636 g (0.03 mol) of trimellitic anhydride was added to the solution mixture and the reaction temperature was gradually raised to 150° C. Carbon dioxide was observed to be produced from the solution. The reaction continued at 150° C. for another two hours to obtain the final polymeric varnish of this invention. The varnish, which has a solid content of 30 percent, exhibits excellent filmability. The polymer product has an inherent viscosity of 0.97 (0.5 g/dl in N-methyl-2-pyrrolidone at 25° C.), a tensile strength of 9.0 Kgf/mm$^2$, an elongation (at break) of 11.08% and a glass transition temperature (Tg) of 161.06° C.

Example 2

7.43 g (0.07 mol) of diethylene glycol was dissolved in 83 ml of N-methyl-2-pyrrolidone contained in a reaction vessel. Then, 25.03 g (0.1 mol) of 4,4'-diphenylmethane diisocyanate was added to the solution. The solution was stirred for 30 minutes at room temperature. After that, 5.7636 g (0.03 mol) of trimellitic anhydride was added to the solution mixture and the reaction temperature was gradually raised to 150° C. The reaction continued at 150° C. for another two hours. The final product polymer varnish has a 30 percent solid content. It exhibits excellent filmability after casting, and has an inherent viscosity (under the same condition as in Example 1) of 0.6, a tensile strength of 8.5 Kgf/mm$^2$, an elongation of 8.0% (at break), and a Tg of 127.7° C.

Example 3

30 g (0.03 mol) of polyester-polyol having an average molecular weight of 1000 was added to 154 ml of N-methyl-2-pyrrolidone contained in a reaction vessel. Then 25.03 g (0.1 mol) of 4,4'-diphenylmethane diisocyanate was added to the solution. The solution was stirred for 30 minutes at room temperature. After that, 13.45 g (0.07 mol) of trimellitic anhydride was added to the solution mixture which was stirred for an additional 30 minutes. Subsequently the reaction temperature was gradually raised to 150° C. The reaction continued at 150° C. for another two hours. The final product polymer varnish has a 30 percent solid content. It exhibits excellent filmability after casting, and has an inherent viscosity (under the same condition as in Example 1) of 0.3, a tensile strength of 2.3 Kgf/mm$^2$, an elongation of 240% (at break), and a Tg of −15° C.

Example 4

15 g (0.015 mol) of polyester-polyol having an average molecular weight of 1000 and 0.93 g (0.015 mol) of ethylene glycol were added to 121 ml of N-methyl-2-pyrrolidone contained in a reaction vessel. Then, 25.03 g (0.1 mol) of 4,4'-diphenylmethane diisocyanate was added to the solution. The solution was stirred for 30 minutes at room temperature. After that, 13.45 g (0.07 mol) of trimellitic anhydride was added to the solution mixture and stirred for an additional 30 minutes. Subsequently the reaction temperature was gradually raised to 150° C. The reaction continued at 150° C. for two hours. The final product polymer varnish has a 30 percent solid content. It has an inherent viscosity (under the same condition as in Example 1) of 0.6, a tensile strength of 6.0 Kgf/mm$^2$, an elongation of 22% (at break), and a Tg of 128.1° C.

Example 5 (Comparative Study)

The comparative study involved preparing polyurethane (I) and polyamideimide (II) separately, then blending the two products to form the final product (III), which is a polyurethane blend.

5.306 g (0.05 mol) of diethylene glycol was added to 41.6 ml of N-methyl-2-pyrrolidone contained in a reaction vessel. Then 12.51 g (0.05 mol) of 4,4'-diphenylmethane diisocyanate was added to the solution. The solution was stirred for 30 minutes at room temperature. Subsequently the reaction temperature was gradually raised to 80° C. The reaction continued at 80° C. for two hours. A polyurethane varnish (I) having a solid content of 30% was obtained.

Polyamideimide (II) was obtained by dissolving 19.2 g (0.1 mol) of trimellitic anhydride in 100 g of N-methyl-2-pyrrolidone contained in a reaction vessel. The solution was stirred at room temperature until complete dissolution. Then, 25.2 g (0.1 mol) of 4,4'-diphenylmethane diisocyanate was added to the solution. The solution was stirred for 30 minutes at room temperature. Sub-sequently the reaction temperature was gradually raised to 150° C. The reaction continued at 150° C. for two hours. The final polyamideimide varnish has a solid content of 30 percent.

The final product (III), which was obtained by blending 30 g of Polyurethane varnish (I) and 70 g of polyamideimide (II) varnish has a tensile strength of 5.8 Kgf/mm$^2$, and an elongation of 7.2% (at break).

Table 1 summarizes the results of all five examples, including the comparative example 5. As illustrated in FIG. 1, the invention discloses a copolymer composition which involves a two-step process in the manufacturing therefor. First, diol and/or polyol is reacted with diisocyanate at room temperature for 30 minutes. The reaction product is then reacted with trimellitic anhydride at 150° C. for two hours. The final product is a linear urethane-amide-imide copolymer whose physical properties are comparable to or even better than those of the polyurethane-polyamideimide blend (Example 5). The main difference, however, is that the copolymer composition disclosed in this invention does not show phase separation problems, which are observed from the blends. As illustrated in Table 1, most of the polyurethane copolymers of this invention, except those made from polyols, have a tensile strength better than 8.5 Kgf/mm². This is better than the 5.8 Kgf/mm² for the polyurethane blend and the 6 Kgf/mm² for most polyurethane. The urethane-amide-imide copolymer of this invention exhibits excellent quality for use as a wire coating varnish and film material, and as electric insulating material. A wide range of products can be obtained by varying the urethan/amideimide ratio without incurring phase separation problems. As indicated in the aforementioned examples and in Table 1, products having elongation from 8 percent to 240 percent can be obtained.

TABLE 1

|  | Example 1 | Example 2 | Example 3 | Example 4 | Example 5 (Comparative Example) |
|---|---|---|---|---|---|
| Urethane (mol %) | 70 | 70 | 30 | 30 | 70 |
| Amideimide (mol %) | 30 | 30 | 70 | 70 | 30 |
| Tg (°C.) | 161.1 | 127.7 | −15 | 128.1 | — |
| Tensile Strength (kgf/mm²) | 9.0 | 8.5 | 2.3 | 6.0 | 5.8 |
| Elongation (%) | 11.08 | 8.0 | 240 | 22 | 7.2 |

What is claimed is:

1. A method for making linear heat resistant urethane-amide-imide copolymer composition for use as wire coating varnish and film material comprising the steps of:
   (a) dissolving X mols of at least one diol compound in an inert organic solvent to form a mixture solution;
   (b) adding Y mols of at least one diisocyanate compound into the mixture solution from step (a), wherein Y is greater than X, thus indicating an excess amount of diisocyanate compound in the mixture solution, and stirring the mixture solution resulted therefrom;
   (c) adding Z mols of trimellitic anhydride into the mixture solution from step (b) wherein Y equals X plus Z; and
   (d) stirring the mixture solution from step (c) to produce said linear urethane-amide-imide copolymer composition.

2. The method for making heat resistant urethane-amide-imide copolymer composition of claim 1 wherein said diisocyanate compound is selected from the group consisting of aromatic diisocyanates, aliphatic diisocyanates, and alicyclic 3. The method for making heat resistant urethane-amide-imide copolymer composition of claim 1 wherein said diisocyanate compound consists essentially of 4,4'-diphenylmethane diisocyanate.

4. The method for making heat resistant urethane-amide-imide copolymer composition of claim 1 wherein said diol compound comprises at least one compound selected from the group consisting of polyester-polyols, polyether-polyols, and aliphatic diols.

5. The method for making heat resistant urethane-amide-imide copolymer composition of claim 4 wherein said aliphatic diol contains 2 to 20 carbon atoms.

6. The method for making heat resistant urethane-amide-imide copolymer composition of claim 1 wherein said inert organic solvent consists essentially of N-methyl-2-pyrrolidone.

7. The method for making heat resistant urethane-amide-imide copolymer composition of claim 1 wherein said step (d) takes places at temperatures between room temperature and 160° C.

8. The method for making heat resistant urethane-amide-imide copolymer composition of claim 1 wherein said step (d) takes place at 150° C.

9. The method for making heat resistant urethane-amide-imide copolymer composition of claim 1 wherein the molal ratio of X/Y ranges from 30/100 to 70/100.

10. A heat resistant linear urethane-amide-imide copolymer composition for use as wire coating varnish and film material consisting essentially of the product from the process which comprises the steps of:
   (a) dissolving at least one diol compound in an inert organic solvent to form a mixture solution;
   (b) adding at least one diisocyanate compound into the mixture solution from step (a), wherein the molal quantity of said diisocyanate compound is greater than the molal quantity of said diol compound, and stirring the mixture solution resulted therefrom;
   (c) adding trimellitic anhydride into the mixture solution from step (b), wherein the molal quantity of isocyanate groups in the mixture solution is stoichiometrically equivalent to the molal sum of hydroxyl, carboxyl, and anhydride groups; and
   (d) stirring the mixture solution from step (c) to produce said linear urethane-amide-imide copolymer composition.

11. The heat resistant urethane-amide-imide copolymer composition of claim 10 wherein said diisocyanate compound is selected from the group consisting of aromatic diisocyanates, aliphic diisocyanates, and alicyclic diisocyanates.

12. The heat resistant urethane-amide-imide copolymer composition of claim 10 wherein said diol compound comprises at least one compound selected from the group consisting of polyester-polyols, polyether-polyols, and aliphatic diols.

13. The heat resistant urethane-amide-imide copolymer composition of claim 12 wherein said aliphatic diol contains 2 to 20 carbon atoms.

14. The heat resistant urethane-amide-imide copolymer composition of claim 10 wherein said diisocyanate compound consists essentially of 4,4'-diphenylmethane diisocyanate.

15. The heat resistant urethane-amide-imide copolymer composition of claim 10 wherein said inert organic solvent consists essentially of N-methyl-2-pyrrolidone.

16. The heat resistant urethane-amide-imide copolymer composition of claim 10 wherein said step (d) takes place at temperatures between room temperature and 160° C.

17. The heat resistant urethane-amide-imide copolymer composition of claim 10 wherein said step (d) takes place at 150° C.

18. The heat resistant urethane-amide-imide copolymer composition of claim 10 wherein the molal ratio between said diol compound and said trimellitic anhydride ranges from 30/70 to 70/30.

* * * * *